2,808,419

MODIFICATION OF FATTY TRIGLYCERIDES WITH TITANIUM ALKOXIDE CATALYSTS

George Y. Brokaw, Rochester, N. Y., assignor to Eastman Kodak Company, Rochester, N. Y., a corporation of New Jersey No Drawing. Application December 13, 1955, Serial No. 552,713

8 Claims. (Cl. 260—405.6)

This invention relates to a process for treating fatty triglyceride compositions, and more particularly, to a process for modifying the properties of vegetable oils and animal fats.

It is often desirable to modify such properties as the melting point, the cloud point, the consistency, the crystallization characteristics, and other physical properties of fatty triglyceride compositions. In illustration, the crystallization characteristics of lard are desirably modified to improve its utility as a shortening agent in bakery products, especially in cakes. Likewise, many properties of vegetable oils are desirably modified to lend improved utility to such oils.

It is an object of this invention to provide a new process for modifying the properties of fatty triglyceride compositions.

It is another object of this invention to rearrange the fatty acid radicals in fatty triglyceride compositions by a novel method.

It is another object of this invention to provide a new catalyst effective for modifying the properties of fatty triglyceride compositions at temperatures higher than about 180° C.

It is another object of this invention to modify the cloud point of vegetable oils by a new process.

It is still another object of this invention to modify the crystallization characteristics of animal fats by novel means.

It is likewise an object of this invention to modify coconut oil by a new process.

It is a further object of this invention to modify cottonseed oil by a new process.

It is also an object of this invention to modify the nature of lard by a new process.

These and other objects of this invention are accomplished by heating a fatty triglyceride composition in the presence of a titanium alcoholate catalyst at a temperature higher than about 180° C. under substantially anhydrous conditions in a medium free of substantial amounts of free fatty acids.

Any of the well-known vegetable and animal fatty triglyceride compositions can be employed in the present process, and includes such fats and oils as lard, lard oil, cottonseed oil, soybean oil, corn oil, peanut oil, palm oil, coconut oil, sardine oil, menhaden oil, beef tallow, and related fatty triglyceride compositions. Fats and oils comprised of triglycerides containing straight-chain unsubstituted fatty acid radicals having at least six carbon atoms are preferably employed in the present process. Such oils as castor oil, which comprise hydroxyl-substituted fatty acid radicals, are less suitably used. The present process is more generally effected with unhydrogenated fatty triglyceride compositions, although hydrogenated fatty triglyceride compositions can also be used.

The titanium alcoholate catalyst employed in the present invention can be represented by the formula $Ti(OR)_4$ wherein R is an aliphatic hydrocarbon radical, and preferably wherein R is a lower alkyl radical containing from one to six carbon atoms. Suitable titanium alcoholate catalysts include such compounds as tetra methyl titanate, tetra ethyl titanate, tetra isopropyl titanate, tetra n-butyl titanate, tetra iso-butyl titanate, tetra stearyl titanate, tetra 2-ethyl hexyl titanate, and related compounds. Such titanium alcoholates have other common names. For example, tetra n-butyl titanate is commonly called titanium tetra butoxide, or simply, titanium butoxide. The effectiveness of these titanium alcoholate catalysts does not depend on the mutual or synergistic action of other materials in the reaction mixture as these titanium alcoholate catalysts can act as independent or sole catalytic entities in the instant process.

The amount of titanium alcoholate catalyst employed can be widely varied, with amounts as low as 0.05% or lower based on the weight of the fatty triglyceride composition in the reaction mixture being suitable. More usually, concentrations of catalyst of the order of 0.1% to 1.0% are employed, although amounts as high as 5% can be used, but are usually not necessary.

The reaction is effected at elevated temperatures higher than about 180° C., and more generally higher than about 200° C., with temperatures in the range of about 230° C. to about 260° C. being eminently suitable. The reaction time is usually varied from about 15 minutes to 1, 2 or even up to 6 hours, depending on such variants as the reaction temperature, the concentration of the catalyst, the nature of the reactants and other variables common to such reactions.

Substantial amounts of water in the present reaction medium decompose the titanium alcoholate catalysts, and thus, the instant process is effected under substantially anhydrous conditions. The minor proportionate amounts of water generally present in the common commercially available fatty triglyceride compositions do not substantially effect the present process.

Also, titanium alcoholates react with free fatty acids to form titanium soaps which are substantially less active in the immediate reaction. Thus, suitable reaction mediums in the present process are of low free fatty acid content, suitably containing as much as about 2%, but more generally containing less than about 1% of the weight of the fatty triglyceride composition in the reaction mixture. Such fatty triglyceride compositions as prime steam rendered lard and refined cottonseed oil which usually contain from 0.5% to 1.0% free fatty acid, and other vegetable oils and animal fats free of substantial amounts of free fatty acids, are entirely suitable in the present process.

In carrying out the invention, the fatty triglyceride composition and a catalytic amount of the titanium alcoholate catalyst are charged into a suitable reactor and maintained at a temperature higher than about 180° C. for periods ranging from about 15 minutes to 1, 2 or up to 6 hours as described hereinabove. The reaction mixture is preferably constantly stirred or agitated. The reaction mixture is thereafter usually refined to bleach the product and to remove the catalyst. The fatty acid radicals in the triglycerides of the resulting reaction mixture appear to have been rearranged or randomized as the fatty triglyceride reaction mixture has properties substantially different from the original, untreated fatty triglyceride composition. Such properties as melting point, cloud point, consistency, crystallization characteristics and the like are modified by the present reaction. Whether cross esterification between the triglycerides in the triglyceride composition takes place in the instant reaction, or whether the individual triglycerides merely isomerize, or whether a combination of both types of rearrangements takes place, is difficult to ascertain. However, the present invention need not be limited to any one reaction theory.

The invention is further illustrated by the following examples of preferred embodiments thereof, it being understood that the examples are illustrative only and not intended to limit the scope of the invention unless otherwise specifically indicated.

*Example 1*

A 300 g. sample of lard and 1.9 g. of tetra n-butyl titanate were charged into a 500 ml. round bottom flask and thereafter reacted at a temperature of 250° C. for one hour with constant stirring. The reaction was effected under substantially anhydrous conditions and the reaction medium was free of substantial amounts of free fatty acids. The reaction mixture was thereafter cooled, 6 g. of "Official Activated Bleaching Earth of the American Oil Chemists' Society" added, maintained at a temperature of about 120° C. for 5 minutes, and thereafter filtered at a temperature of about 100°–120° C. The resulting treated lard had a cloud point of 23.0° C., while a sample of untreated lard had a cloud point of 26.5° C. Further, the treated lard was a partly liquid and partly solid composition at room temperature, while the untreated lard was a solid composition at room temperature. In addition, the treated lard showed different crystallization characteristics than the untreated lard in that the long, needle-like crystals present in the untreated lard were less abundant in the treated lard. Usually about 8%–10% of lard flakes (fully hydrogenated lard) are added to the treated lard product and the resulting mixture passed through a plasticizer to give a shortening material of a more desired consistency. Such modified lard compositions are particularly effective for use in preparing cakes having enhanced volumes. The following standard cake formula is used to test the effectiveness of such shortening materials:

| | Parts by weight |
|---|---|
| Extra fine granulated sugar | 2 |
| Lard | 1 |
| Eggs | 1 |
| Salt | 1/16 |
| Reconstituted skim milk | 1 |
| Cake flour | 2 |

Cake batter prepared from the above formula is then baked for 65 minutes at 360° F. Cakes made with this formula and containing lard treated or modified by the method described in this example have substantially greater volume than cakes baked with unmodified lard.

*Example 2*

To a 300 g. sample of refined cottonseed oil was added 1.9 g. of tetra n-butyl titanate. The resulting composition was reacted at a temperature of 250° C. for one hour with constant stirring under substantially anhydrous conditions and with the reaction medium free of substantial amounts of free fatty acids. The resulting reaction mixture was cooled, 6 g. of "Official Activated Bleaching Earth of the American Oil Chemists' Society" added, maintained at a temperature of about 120° C. for 5 minutes, and thereafter filtered at a temperature of about 100°–120° C. The resulting treated or modified cottonseed oil had a cloud point of —4° C., while a sample of untreated cottonseed oil had a cloud point of —6° C. Thus, by means of the present process the cloud point of vegetable oils can be modified.

*Example 3*

The present process can be used to improve the properties of fatty triglyceride compositions having such fatty acid radicals as caproyl, caprylyl, capryl and lauroyl which often hydrolyze to fatty acids contributing to bad odor and flavor in the fatty material. Typical of such fatty materials is coconut oil. By treating coconut oil with a titanium alcoholate catalyst in accordance with the methods disclosed in the preceeding examples, a modified composition results which can be distilled to remove a larger proportion of lower molecular weight triglycerides containing odor and taste reverting fatty acid radicals than can be removed by distilling unmodified coconut oil. Thin film, high vacuum distillations at temperatures of about 170°–190° C. and at a pressure of about 25 microns of mercury can be suitably used to strip off such lower molecular weight fractions.

Thus, by means of this invention, many properties of fatty triglyceride compositions can be readily modified. More particularly, titanium alcoholates are suitable catalysts in effecting the modification of vegetable oils and animal fats.

Although the invention has been described in considerable detail with reference to certain preferred embodiments thereof, it will be understood that variations and modifications can be effected within the spirit and scope of the invention as described hereinabove and as defined in the appended claims.

This application is a continuation-in-part of my copending application, U. S. Serial No. 388,065, filed October 23, 1953.

I claim:

1. The process for treating vegetable oils which comprises heating a vegetable oil at a temperature higher than about 200° C. and less than about 300° C. in the presence of a titanium alcoholate catalyst having the formula $Ti(OR)_4$ wherein R is a lower alkyl radical having from one to six carbon atoms, said treating being effected under substantially anhydrous conditions in a medium free of substantial amounts of free fatty acids.

2. The process for treating animal fats which comprises heating an animal fat at a temperature higher than about 200° C. and less than about 300° C. in the presence of a titanium alcoholate catalyst having the formula $Ti(OR)_4$ wherein R is a lower alkyl radical having from one to six carbon atoms, said treating being effected under substantially anhydrous conditions in a medium free of substantial amounts of free fatty acids.

3. In the modification of fatty triglyceride compositions, the process which comprises treating a fatty triglyceride composition selected from the class consisting of vegetable oils and animal fats at a temperature higher than about 200° C. and less than about 300° C. in the presence of a titanium alcoholate catalyst having the formula $Ti(OR)_4$ wherein R is a lower alkyl radical having from one to six carbon atoms, said treating being effected under substantially anhydrous conditions in a reaction medium free of substantial amounts of free fatty acids.

4. In the modification of fatty triglyceride compositions, the process which comprises treating a fatty triglyceride composition selected from the class consisting of vegetable oils and animal fats at a temperature higher than about 200° C. and less than about 300° C. in the presence of tetra n-butyl titanate, said treating being effected under substantially anhydrous conditions in a reaction medium free of substantial amounts of free fatty acids.

5. The process which comprises heating a fatty triglyceride composition selected from the class consisting of vegetable oils and animal fats to a temperature in the range of about 230° C. to about 260° C. in the presence of a titanium alcoholate catalyst under substantially anhydrous conditions in a medium free of substantial amounts of free fatty acids, said catalyst having the formula $Ti(OR)_4$ wherein R is a lower alkyl radical having from one to six carbon atoms.

6. The process which comprises heating lard to a temperature in the range of about 230° C. to about 260° C. in the presence of a titanium alcoholate catalyst under substantially anhydrous conditions in a medium free of substantial amounts of free fatty acids, said catalyst having the formula $Ti(OR)_4$ wherein R is a lower alkyl radical having from one to six carbon atoms.

7. The process which comprises heating cottonseed oil to a temperature in the range of about 230° C. to about 260° C. in the presence of a titanium alcoholate catalyst under substantially anhydrous conditions in a medium free of substantial amounts of free fatty acids, said catalyst having the formula Ti(OR)$_4$ wherein R is a lower alkyl radical having from one to six carbon atoms.

8. The process which comprises heating coconut oil to a temperature in the range of about 230° C. to about 260° C. in the presence of a titanium alcoholate catalyst under substantially anhydrous conditions in a medium free of substantial amounts of free fatty acids, said catalyst having the formula Ti(OR)$_4$ wherein R is a lower alkyl radical having from one to six carbon atoms.

References Cited in the file of this patent

UNITED STATES PATENTS

| | | |
|---|---|---|
| 2,242,230 | Burr | May 20, 1941 |
| 2,625,483 | Mattil | Jan. 13, 1953 |
| 2,688,626 | Miller | Sept. 7, 1954 |
| 2,726,158 | Cochran et al. | Dec. 6, 1955 |

UNITED STATES PATENT OFFICE

CERTIFICATE OF CORRECTION

Patent No. 2,808,419                          October 1, 1957

George Y. Brokaw

It is hereby certified that error appears in the printed specification of the above numbered patent requiring correction and that the said Letters Patent should read as corrected below.

Column 2, line 23, after "200° C." and before the comma insert -- and less than about 300° C. --.

Signed and sealed this 3rd day of December 1957.

(SEAL)
Attest:

KARL H. AXLINE
Attesting Officer

ROBERT C. WATSON
Commissioner of Patents